(12) United States Patent
Andersson et al.

(10) Patent No.: US 7,249,586 B2
(45) Date of Patent: Jul. 31, 2007

(54) APPARATUS AND METHOD FOR LIMITING EXCESSIVE ENGINE SPEEDS IN A LIGHT-DUTY COMBUSTION ENGINE

(75) Inventors: Martin N. Andersson, Caro, MI (US); George M. Pattullo, Caro, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 0 days.

(21) Appl. No.: 11/295,199

(22) Filed: Dec. 6, 2005

(65) Prior Publication Data

US 2007/0125336 A1 Jun. 7, 2007

(51) Int. Cl.
*F02P 9/00* (2006.01)
*F02P 5/15* (2006.01)

(52) U.S. Cl. .................. 123/335; 123/601
(58) Field of Classification Search ......... 123/198 DC, 123/334, 335, 406.56, 406.57, 594, 599, 123/601, 604, 605, 618, 630; 701/110, 111
See application file for complete search history.

(56) References Cited

U.S. PATENT DOCUMENTS

| | | | | |
|---|---|---|---|---|
| 4,211,195 A | * | 7/1980 | Zechlin | 123/335 |
| 4,404,940 A | * | 9/1983 | Sieja | 123/335 |
| 4,606,323 A | * | 8/1986 | Nash | 123/406.57 |
| 4,697,560 A | * | 10/1987 | Umehara | 123/335 |
| 5,755,199 A | * | 5/1998 | Costello et al. | 123/335 |
| 6,408,820 B1 | * | 6/2002 | LaMarr, Jr. | 123/406.57 |
| 6,932,064 B1 | * | 8/2005 | Kolak et al. | 123/605 |

FOREIGN PATENT DOCUMENTS

JP       59180066 A  * 10/1984    ............ 123/406.57

* cited by examiner

*Primary Examiner*—Willis R Wolfe, Jr.
(74) *Attorney, Agent, or Firm*—Reising, Ethington, Barnes, Kisselle, P.C.

(57) ABSTRACT

A controlled slow down apparatus and method for use in the event that a light-duty combustion engine has entered a state of excessive speeds or auto-ignition. The controlled slow down method is preferably initiated when the engine speed exceeds an activation speed for a predetermined number of engine revolutions. Once initiated, the controlled slow down method uses a combination of ignition timing and spark ratio manipulations in order to disrupt the auto-ignition conditions and slow down the engine in a controlled manner. Preferably, the controlled slow down method is only one part of an overall ignition control method, and can be incorporated within or utilized by one of a number of different ignition timing methods known in the art.

20 Claims, 4 Drawing Sheets

APPARATUS AND METHOD FOR LIMITING EXCESSIVE ENGINE SPEEDS IN A LIGHT-DUTY COMBUSTION ENGINE

FIELD OF THE INVENTION

The present invention generally relates to ignition systems for light-duty combustion engines, and more particularly, to ignition control circuits and methods for limiting excessive engine speeds.

BACKGROUND OF THE INVENTION

The term 'light-duty combustion engine' used herein broadly includes all types of non-automotive combustion engines including, but not limited to, two- and four-stroke engines used with hand-held power tools, lawn and garden equipment, lawnmowers, weed trimmers, edgers, chain saws, snowblowers, personal watercraft, boats, snowmobiles, motorcycles, all-terrain-vehicles, etc. Most light-duty combustion engines have some type of engine speed limiting device that prevents the engine from experiencing excessive speeds that could otherwise cause unwanted damage or catastrophic failure.

For instance, it is known to provide a light-duty combustion engine with a device that restricts the engine speed by simply stopping the combustion-initiating spark from being delivered to the combustion chamber when the engine exceeds a predetermined maximum speed. Though this approach is usually effective, under certain operating conditions the engine may experience a situation where an unintentional ignition occurs even though the ignition system has not provided any spark. This situation is generally referred to as 'auto ignition' and can include circumstances such as 'dieseling', 'backfiring', 'active radical combustion', 'glow plug effect', etc.

Typically, auto ignition occurs when the engine is being run at high temperatures and/or compression ratios such that the amount of energy present in the combustion chamber is sufficient to ignite air/fuel charges without requiring a spark. For example, when an engine operating at high speeds is suddenly turned off or otherwise shut down, there could hot spots or a glow plug effect in the engine that are hot enough to ignite nearby air/fuel charges; this is particular true during a compression stroke where the pressure within the combustion chamber is at elevated levels.

SUMMARY OF THE INVENTION

According to one embodiment, there is provided a light-duty combustion engine having a crankshaft, a spark plug and an ignition system. The ignition system generally includes a sensor for providing an engine speed signal, a control circuit, and an ignition coil for providing a high voltage ignition pulse to the spark plug. If the engine speed signal indicates that the engine speed is greater than an activation speed for a predetermined number of engine revolutions, then a controlled slow down method is executed.

According to another embodiment, there is provided an ignition control method for use with a light-duty combustion engine. This method includes the steps of: (a) determining an engine speed, (b) comparing the engine speed with an activation speed, and (c) initiating a controlled slow down method when the engine speed exceeds the activation speed for a predetermined number of engine revolutions. The controlled slow down method manipulates ignition timing and a spark ratio in order to slow down the speed of the engine in a controlled manner.

At least some of the potential objects, features and advantages of the controlled slow down method and/or the ignition control circuit disclosed herein include providing a method that slows down an engine in a controlled manner in the event that the engine has entered a state of excessive speed or auto-ignition, avoiding prolonged excessive engine speed, damage, backfiring, blue flame discharging, and after booms, and providing an ignition system and ignition control circuit that is relatively simple and economical to manufacture and assemble, and has a long and useful life in service.

BRIEF DESCRIPTION OF THE DRAWINGS

These and other objects, features and advantages of the present invention will be apparent from the following detailed description of the preferred embodiments and best mode, the appended claims, and the accompanying drawings, in which:

DETAILED DESCRIPTION OF THE PREFERRED EMBODIMENTS

The controlled slow down method disclosed herein limits excessive engine speed for a light-duty combustion engine so that undesirable damage to the engine, operator, or others can be avoided. Preferably, the controlled slow down method is embodied in some form of electronic instructions that are automatically executed by an ignition control circuit which is part of a larger spark ignition system. The following paragraphs describe examples of a spark ignition system and an ignition control circuit that may utilize the controlled slow down method, however, they are just illustrative examples and numerous other systems and circuits could be utilized instead.

Ignition System—

Figure 1:
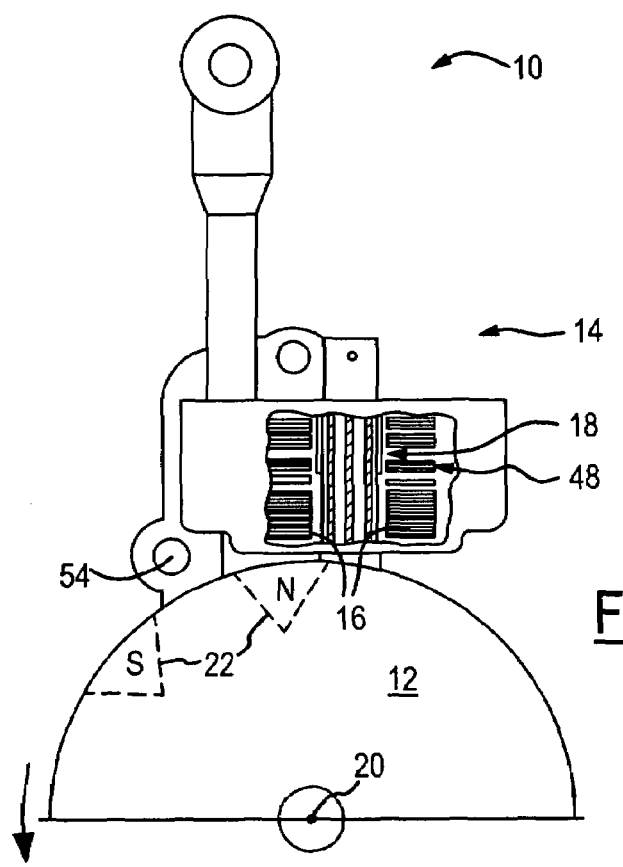
FIG. 1 is a fragmentary plan view with a portion broken away of an embodiment of an ignition system for use with a light-duty combustion engine.

Referring to FIG. 1, there is shown an example of an ignition system 10 for a light-duty combustion engine that can utilize the controlled slow down method disclosed herein. Ignition system 10 is preferably a capacitive discharge-type ignition system that interacts with a flywheel 12 and generally includes an ignition control circuit 14, a sensor or input winding 16, and an ignition coil having primary and secondary windings 18, 48, respectively. The flywheel 12 is coupled to an engine crankshaft (not shown) and rotates about an axis 20 under the power of the engine. By using its rotational inertia, the flywheel moderates fluctuations in engine speed, thereby providing a more constant and even output. Flywheel 12 includes magnetic sections 22 located near an outer circumference of the flywheel. Once the flywheel is rotating, these magnetic sections 22 spin past and electromagnetically interact with an engine speed sensor, which in this particular case is input winding 16, so that a voltage proportional to the rotational speed of flywheel 12, and hence the engine, is induced in the input winding.

Ignition Control Circuit—

Figure 2:
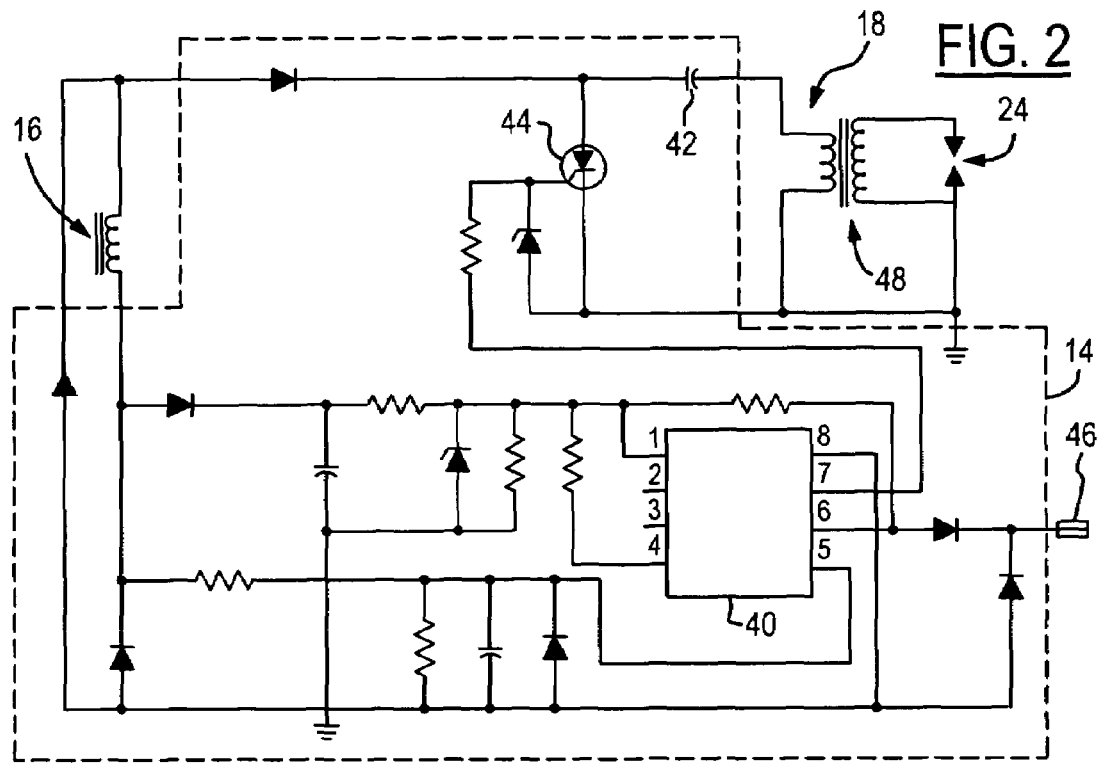
FIG. 2 is a circuit diagram of an embodiment of an ignition control circuit for use with the ignition system of FIG. 1.

With reference to FIG. 2, there is shown an example of an ignition control circuit 14 capable of utilizing the controlled slow down method to limit excessive engine speeds. Ignition control circuit 14 interacts with input winding 16 and primary winding 18, and is primarily responsible for storing and delivering high voltage ignition pulses to a spark plug 24 according to a desired ignition timing. Ignition control circuit 14 can, of course, accomplish additional tasks and generally includes an electronic processor 40, a main discharge capacitor 42, a switching thyristor 44 and a kill-switch 46.

Electronic processor 40 is preferably an 8-pin, 4 MHz processor, such as model #12509 produced by Microchip, Inc., that utilizes 1024 Kb of memory to store the firmware or other instructions for operating the overall ignition timing of the engine, as well as that for the controlled slow down method. The term 'electronic processor' broadly includes all types of microcontrollers, microprocessors, as well as any other type of electronic processing device capable of executing electronic instructions, including both digital and analog processors. Pins 1 and 4 of electronic processor 40 are coupled to input winding 16 such that the voltage induced in the input winding supplies the electronic processor with power. When a voltage is induced in input winding 16, current passes through a diode and charges main discharge capacitor 42, assuming main switching thyristor 44 is in a non-conductive state. Main discharge capacitor 42 holds the stored charge until the electronic processor 40 changes the state of thyristor 44, at which point the capacitor dumps the stored charge and creates a high voltage ignition pulse in a secondary winding 48, as is known by those skilled in the art.

Pin 5 is also coupled to input winding 16 and receives an engine speed signal which is indicative of the engine speed. This engine speed signal can be used to calculate a desired ignition timing, as explained more thoroughly in U.S. application Ser. Nos. 10/186,522 and 10/765,415, each of which is hereby incorporated by reference. The engine speed signal is also used by the controlled slow down method, as will be subsequently explained in greater detail. Pin 6 is coupled to kill-switch 46, which acts as a manual override for shutting down the engine. Pin 7 is preferably coupled to the gate of thyristor 44 and transmits an ignition trigger signal which controls the state of the thyristor. The term 'trigger signal' is used herein to broadly include any type of electronic signal that when sent causes an ignition control circuit, not just those of capacitive discharge ignition systems, to deliver a high voltage ignition pulse to a spark plug. When the trigger signal on pin 7 is low, the thyristor 44 is nonconductive and capacitor 42 is allowed to charge; when the trigger signal is high, the thyristor is conductive and the capacitor discharges. Thus, electronic processor 40 governs the discharge of capacitor 42 by controlling the conductive state of thyristor 44 with a trigger signal. Lastly, pin 8 provides the electronic processor with a ground reference.

In general operation of ignition control circuit 14, the rotating flywheel 12 induces a voltage in input winding 16 that performs several functions: i) it charges main discharge capacitor 42, ii) it provides electronic processor 40 with power, and iii) it provides the electronic processor with an engine speed signal. As main discharge capacitor 42 charges, the electronic processor 40 executes a series of instructions that control different aspects of the ignition process, including any ignition timing calculations that need to be performed. Electronic processor 40 then outputs a trigger signal on pin 7, according to a calculated ignition timing, which turns on thyristor 44. Once the thyristor 44 is conductive, a voltage is created across primary winding 18 which induces a high voltage ignition pulse in secondary winding 48. This high voltage ignition pulse is then delivered to spark plug 24 where it arcs across a spark gap, thus beginning the combustion process. If at any time kill-switch 46 is activated, then one of several shut down methods can be initiated, including the method disclosed in U.S. patent application Ser. No. 10/955,108, filed Sep. 30, 2004, which is hereby incorporated by reference.

Controlled Slow Down Method—

The controlled slow down method can generally be thought of as a subroutine called upon to bring a light-duty combustion engine under control if and when it enters a state of excessive speeds or auto-ignition. Preferably, the controlled slow down method is one part of an overall ignition control method, and can be incorporated within or utilized by one of a number of different ignition timing methods known in the art. Therefore, instead of describing known ignition control methods, such as those disclosed in the U.S. patent applications referenced above, the following description is directed to the controlled slow down method itself. It should be understood, however, that use of the slow down method is not limited to the specific ignition system, ignition control circuit, or ignition control method embodiments described herein, as they are only provided for exemplary purposes.

Figure 3A:
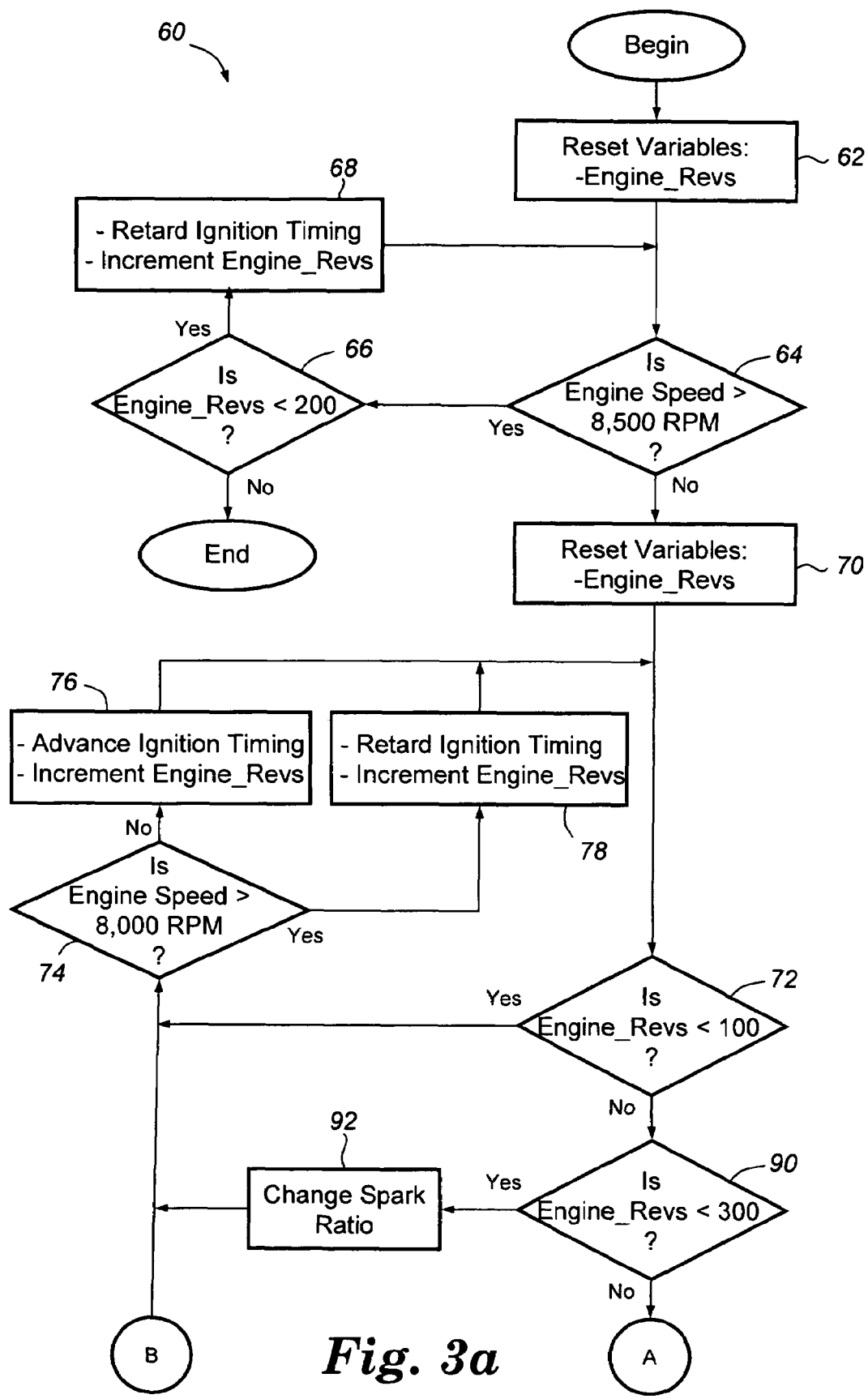
FIGS. 3a–3c are flowcharts demonstrating an embodiment of a controlled shut down method that can be used with the ignition control circuit of FIG. 2.
Figure 3B:
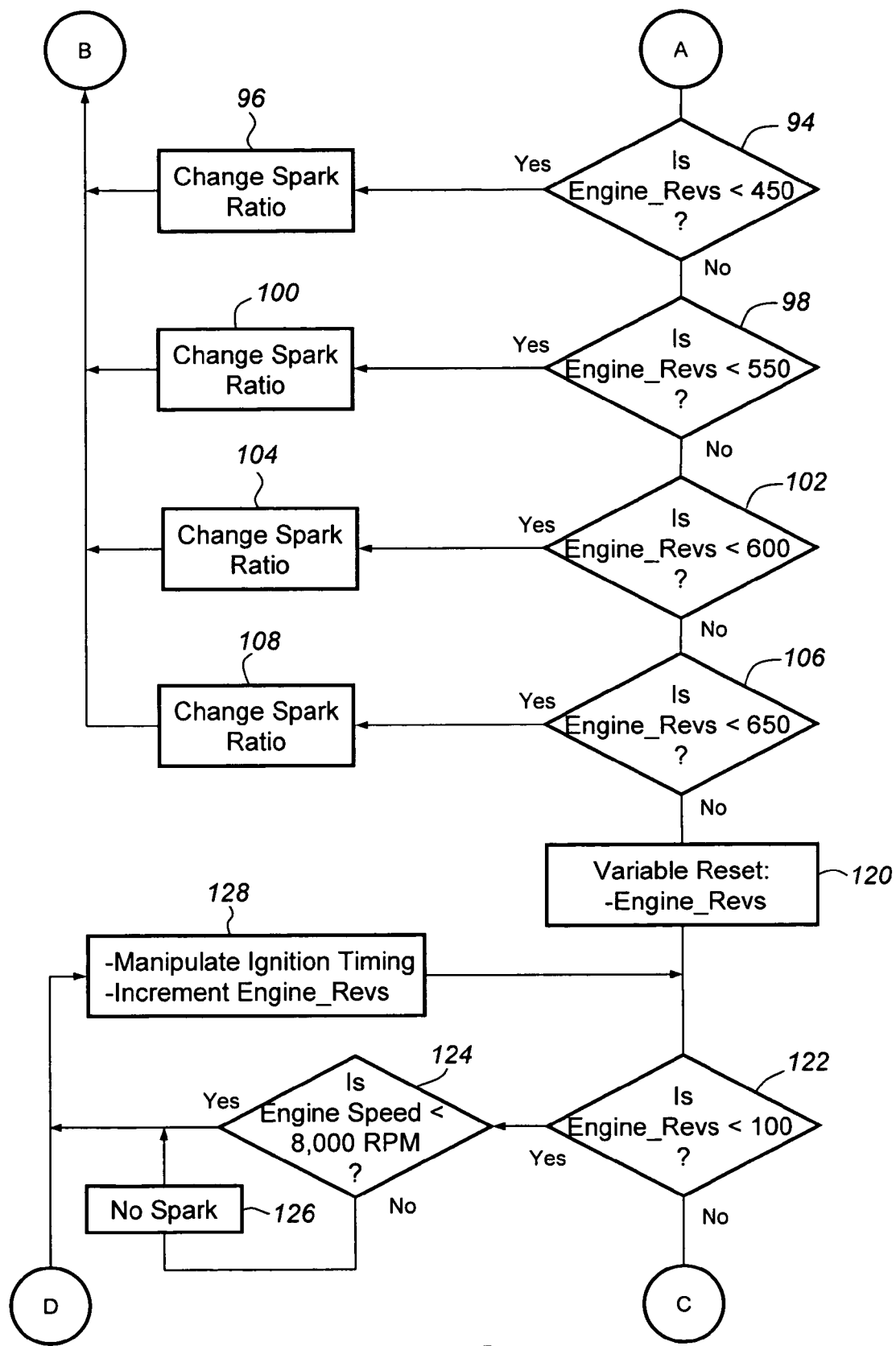
Figure 3C:
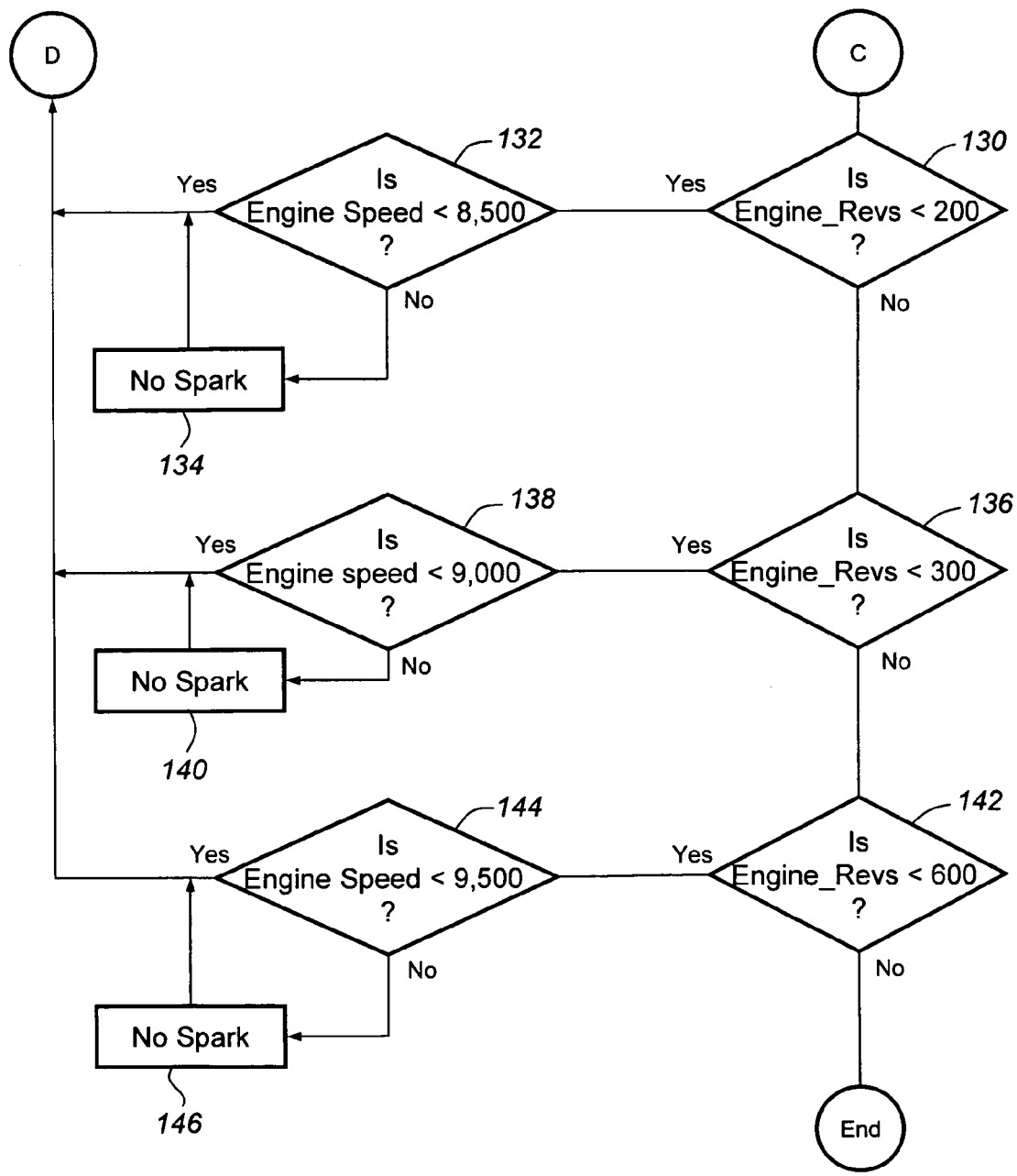

Turning now to FIGS. 3a–c, there is shown a flowchart outlining the steps of an embodiment of a controlled slow down method 60 used in conjunction with an exemplary two-stroke engine. It should be appreciated, however, that the controlled slow down method can also be used with a four-stroke engine and that engine-specific changes to the various operating parameters (numbers of engine revolutions, RPMs, etc.) may have to be made in order to accommodate the particular engine involved.

The controlled slow down method is preferably initiated when the engine speed, as determined from the engine speed signal, exceeds an activation speed for a predetermined number of engine revolutions. The activation speed should be greater than the governing speed during normal engine operation so that if the engine surpasses the activation speed for the requisite number of engine revolutions, then the engine is known to be operating in a state of excessive speeds or auto-ignition. In a preferred embodiment, slow down method 60 is initiated when the engine speed exceeds an activation speed in the range of 9,500 RPM–11,000 RPM (even more preferably about 10,200 RPM) for 4 consecutive engine revolutions. This preferable range for an activation speed is generally higher than a preferred governing speed of about 9,500 RPM. It is possible for the predetermined number of engine revolutions (4 in the preceding example) to be equal to 1, in which case, exceeding the activation speed even momentarily would cause the controlled slow down method to be initiated.

According to the exemplary ignition control methods disclosed in the aforementioned U.S. applications, an Overall Timing value is used to dictate the final or overall ignition timing of the engine. The Overall Timing value is determined by adding together an Advance value, which represents ignition timing under normal operations, and a BaseTime value, which is an additional timing value typically determined according to a specific operating sequence. Therefore, the Overall Timing Value is the sum of the Advance and BaseTime values and preferably varies from 45° before TDC (top dead center) to 15° after TDC. It should be noted, this technique of combining an Advance value with a BaseTime value to arrive at an Overall Timing Value is simply a preferred ignition control method, and is not required for use of the controlled slow down method which can be used with any one of a number of different ignition control methods and techniques.

Controlled slow down method 60 includes a first phase (steps 62–68) that attempts to bring the engine under control by incrementally retarding the ignition timing until either the engine speed falls below a first target value or a predetermined number of engine revolutions occurs. In step 62, different variables, counters, flags, etc. can be reset or initialized, including an Engine_Revs counter which is reset to 0. Step 64 compares the current engine speed to the first target value which, in a preferred embodiment, is 8,000 RPM–9,000 RPM and is even more desirably about 8,500 RPM. If the speed is greater than the first target value, then step 66 determines if the engine has experienced 200 engine revolutions since the beginning of the first phase. If Engine_Revs is greater than or equal to 200 and the current engine speed still exceeds the first target value, then it is determined that controlled slow down method 60 is not effectively combating the excessive speed or auto-ignition environment and the controlled slow down method is exited. It is possible at this point to initiate a controlled shut down method, such as that disclosed in U.S. patent application Ser. No. 10/955,108 referenced above. If step 66 determines that Engine_Revs is less than 200, then the ignition timing is decremented or retarded in step 68 according to a first rate of retard (0.3°/revolution in a preferred embodiment) and counter Engine_Revs is incremented. The first phase of controlled slow down method 60 continues until either step 64 determines that the current engine speed is less than or equal to the first target value or Engine_Revs exceeds 200. A maximum ignition timing retard could be set such that the timing is never retarded beyond a certain amount, such as 15° after TDC, no matter how many times step 68 is executed.

The controlled slow down method 60 further includes a second phase which attempts to bring the engine under control by utilizing a combination of ignition timing and spark ratio manipulations to disrupt the excessive speed or auto-ignition state, and generally includes steps 70–104. The Engine_Revs counter is reset to 0 in step 70 and is compared to a predetermined number of engine revolutions, such as 100, in step 72. So long as Engine_Revs is less than 100, step 74 takes a current engine speed reading and compares that reading to a second target value, which according to a preferred embodiment is in the range of 7,500 RPM–8,500 RPM and is even more preferably about 8,000 RPM. If the current engine speed reading is less than or equal to the second target value, then step 76 advances the ignition timing according to a second rate of advance (1°/revolution in a preferred embodiment) and increments Engine_Revs. Conversely, if the current engine speed reading is greater than the second target value, then step 78 retards the ignition timing according to a second rate of retard (1°/revolution in a preferred embodiment) and increments Engine_Revs. A maximum timing advance, such as 35° before TDC, and a maximum timing retard, such as 15° after TDC, can be established. This cycle of steps 70–78 continues until Engine_Revs exceeds the predetermined number used by step 72.

In a manner similar to that of step 72, step 90 determines whether or not Engine_Revs is below a certain predetermined number of engine revolutions, such as 300 in this example. Accordingly, for the period where Engine_Revs is between 100–299 revs, step 92 will control the ratio of sparks being delivered to spark plug 24 according to a first spark ratio. For instance, step 92 preferably changes the spark ratio from the standard ratio of 1:1 where a spark is sent to the spark plug every engine revolution, to a ratio of 3:4 where three out of four engine revolutions result in a spark. This results in a 'skipped spark' which helps slow down the engine, but causes a more intense air/fuel charge due to its accumulation during the skipped spark revolution. This accumulation of air/fuel charge may also cool down the engine combustion chamber and thereby decrease or stop the state of auto-ignition.

The same general approach is used for steps 94, 96 which maintain the spark ratio at 1:2 during the period when Engine_Revs is between 300–449, for steps 98, 100 which maintain a spark ratio of 1:3 during the period when Engine_Revs is between 450–549, for steps 102, 104 which maintain the spark ratio at 1:4 during the period when Engine_Revs is between 550–559, and for steps 106, 108 which maintain a spark ratio of 1:5 during the period when Engine_Revs is between 601–649. It should be appreciated, that following the execution of each of the pairs of steps in 90–108, steps 74–78 manipulate the ignition timing of the engine based on the comparison of the current engine speed to the second target value (8,000 RPM).

Controlled slow down method 60 includes a third phase (steps 120–146) that generally attempts to bring the engine speed up to a level that is near the normal governing speed by slowly manipulating the ignition timing. In step 120 the Engine_Revs counter is reset to 0, and in step 122 Engine_Revs is compared with a predetermined number of engine revolutions (100 in a preferred embodiment). If Engine_Revs is less than 100, then control passes to step 124 which compares the current engine speed to a new target value, such as 8,000 RPM. In the event that the current engine speed is equal to or greater than 8,000 RPM, then the third phase attempts to slow down the engine by shutting off the spark for one engine revolution, step 126. If the engine is already operating at a speed that is less than 8,000 RPM, then there is no need to slow down the engine further so control passes to step 128 where the ignition timing is incrementally adjusted towards a desired ignition timing value and the Engine_Revs counter is incremented. In a preferred embodiment, the desired ignition timing value is in the range of 20°–35° before TDC, and in a most preferred embodiment it is about 28° before TDC. In this example, if the current ignition timing is more advanced than 28° before TDC, then the ignition timing is retarded according to a third rate of retard such as 1°/20 Revolutions; if the current ignition timing is more retarded than 28° before TDC, then the ignition timing is advanced according to a third rate of advance. The third rates of retard and advance can either be the same or they can differ from one another. Once the desired ignition timing value (28° before TDC in this example) is reached, then subsequent executions of step 128 do not result in ignition timing changes. This combination of steps 122–128 is repeated for the first 100 engine revolutions of the third phase and uses 8,000 RPM as a speed limit of sorts, in that the method turns off the spark when the engine exceeds that speed.

In a similar manner, steps 130–134 are repeated for the next 100 engine revolutions but use a higher engine speed (8,500 RPM in this example), steps 136–140 are executed for the following 100 engine revolutions and use a speed limit of 9,000 RPM, and finally steps 142–146 are repeated for the following 300 engine revolutions and use a speed of 9,500 RPM. All of this occurs at the same time that step 128 is incrementally manipulating the ignition timing towards the desired ignition timing value. Accordingly, the third phase slowly increases the target speed from 8,000 RPM to 9,500 RPM over a period of 600 engine revolutions so that when the third phase is exited, the engine will be operating at a speed that is proximate the normal governing speed of the engine and the ignition timing will be firing according to a desired ignition timing value. Once 600 engine revolutions of the third phase have occurred, the controlled slow down method 60 is exited and a normal ignition control method is resumed.

It should be appreciated that in addition to the steps outlined above, a number of additional exiting points or steps could be inserted throughout the controlled slow down method. For example, if the current engine speed ever drops below 5,000 RPM, then it will be assumed that the engine has been sufficiently slowed down and method 60 will be exited so that normal ignition control may resume. Also, during operation of the controlled slow down method if the engine speed suddenly accelerates to a level exceeding that of the activation level (10,200 RPM in the example above), then it will be assumed that method 60 is ineffective in combating these excessive engine speeds. In that case, the controlled slow down method 60 will be exited so that a controlled shut down method, such as that previously mentioned, may take over and shut the engine down. These are, of course, only some of the possible ways in which the operation of the controlled slow down method may be monitored and exited.

It will thus be apparent that there has been provided in accordance with this invention a controlled slow down method and ignition control circuit for use with light-duty combustion engines which achieves the aims and advantages specified herein. It will, of course, be understood that the forgoing description is of preferred exemplary embodiments of the invention and that the invention is not limited to the specific embodiments shown. Various changes and modifications will become apparent to those skilled in the art and all such changes and modifications are intended to be within the scope of this invention. For instance, the various engine speed values, numbers of engine revolutions, rates of ignition timing advances and retards, spark ratios, etc. used throughout the controlled slow down method are provided for exemplary purposes only and can differ from the specific embodiments described above. Average engine speeds calculated over a predetermined number of engine revolutions could be used instead of a single reading. Moreover, the high voltage ignition pulse could be generated by systems other than a capacitive discharge ignition system, such as a "flyback" type ignition system. Also, operational steps could be added, removed, substituted, altered, etc., as those shown are simply exemplary method steps.

As used in this specification and appended claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Terms of degree such as "about", "near" and "proximate" include not only the specified number, but also variations that do not have a substantial impact on the characteristics or application of that to which the number relates. The term "inclusive" when used in conjunction with a range is intended to include the limits or boundaries within that range. Other terms are to be construed using their broadest reasonable meaning unless they are used in a context that requires a different interpretation.

The invention claimed is:

1. A light-duty combustion engine, comprising:
   a crankshaft;
   a spark plug; and
   an ignition system, having:
      a sensor for providing an engine speed signal;
      a control circuit having a circuit input coupled to said sensor for receiving said engine speed signal, an electronic processor, and a circuit output; and
      an ignition coil coupled to said circuit output for providing a high voltage ignition pulse to said spark plug;
   wherein if said engine speed signal indicates that the engine speed is greater than an activation speed for a predetermined number of engine revolutions, then said electronic processor executes a controlled slow down method that manipulates an ignition timing and a spark ratio of said ignition pulse so that the engine is slowed down in a controlled manner.

2. The light-duty combustion engine of claim 1, wherein said controlled slow down method includes a first phase that generally attempts to bring the engine under control by incrementally retarding said ignition timing.

3. The light-duty combustion engine of claim 1, wherein said controlled slow down method includes a second phase that generally attempts to bring the engine under control by utilizing a combination of ignition timing and spark ratio manipulations to disrupt a state of auto-ignition.

4. The light-duty combustion engine of claim 1, wherein said controlled slow down method includes a third phase that generally attempts to bring the engine speed up to a level that is near a normal governing speed by slowly manipulating said ignition timing.

5. An ignition control method for use with a light-duty combustion engine, comprising the steps of:
   (a) determining an engine speed;
   (b) comparing said engine speed with an activation speed;
   (c) initiating a controlled slow down method when said engine speed exceeds said activation speed for a predetermined number of engine revolutions, said controlled slow down method includes the steps of:
      (i) manipulating an ignition timing of one or more sparks provided to the engine; and
      (ii) manipulating a spark ratio of one or more sparks provided to the engine, wherein said controlled slow down method slows down the speed of the engine in a controlled manner.

6. The method of claim 5, wherein said controlled slow down method is generally initiated to address a state of auto-ignition.

7. The method of claim 5, wherein said activation speed is greater than a normal governing speed of the engine.

8. The method of claim 7, wherein said activation speed is in the range of 9,500 RPM to 11,000 RPM, inclusive.

9. The method of claim 5, wherein said controlled slow down method includes a first phase that generally attempts to bring the engine under control by incrementally retarding said ignition timing.

10. The method of claim 9, wherein said first phase compares a current engine speed to a first target value; if said current engine speed is greater than said first target value and the number of engine revolutions of said first phase is less than a predetermined amount, then said ignition timing is retarded according to a first rate of retard; if said current engine speed value is less than or equal to said first target value, then said first phase is exited.

11. The method of claim 10, wherein said first target value is in the range of 8,000 RPM–9,000 RPM, inclusive.

12. The method of claim 10, wherein if said number of first phase engine revolutions is equal to or greater than said predetermined amount, then said controlled slow down method is exited.

13. The method of claim 5, wherein said controlled slow down method includes a second phase that generally attempts to bring the engine under control by utilizing a combination of ignition timing and spark ratio manipulations to disrupt a state of auto-ignition.

14. The method of claim 13, wherein said second phase utilizes a plurality of spark ratios that are generally within the range of 1:1 to 1:5, inclusive.

15. The method of claim 13, wherein said second phase compares a current engine speed value to a second target value; if said current engine speed value is greater than said second target value, then said ignition timing is retarded according to a second rate of retard; if said current engine speed value is less than or equal to said second target value, then said ignition timing is advanced according to a second rate of advance.

16. The method of claim 15, wherein said second target value is in the range of 7,500 RPM–8,500 RPM, inclusive.

17. The method of claim 5, wherein said controlled slow down method includes a third phase that generally attempts to bring the engine speed up to a level that is near a normal governing speed by slowly manipulating said ignition timing.

18. The method of claim 17, wherein said third phase utilizes a plurality of target speeds to encourage the engine to operate at a speed that is near said normal governing speed and at a desired ignition timing.

19. The method of claim 17, wherein said third phase compares a current ignition timing value to a desired ignition timing value; if said current ignition timing value is more advanced than said desired ignition timing value, then said ignition timing is retarded according to a third rate of retard; if said current ignition timing value is more retarded than said desired ignition timing value, then said ignition timing is advanced according to a third rate of advance.

20. The method of claim 19, wherein said desired ignition timing value is in the range of 20°–35° before TDC, inclusive.

* * * * *